H. L. WESTERHAUS.
IMPLEMENT FOR PICKING UP EARS OF CORN.
APPLICATION FILED APR. 26, 1921.
1,412,201. Patented Apr. 11, 1922.
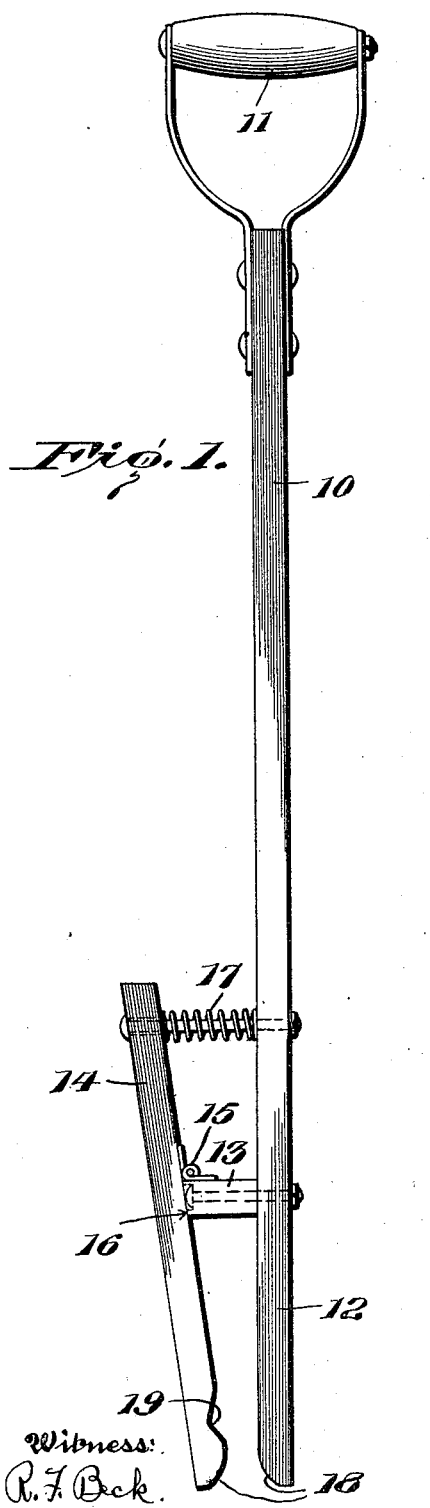
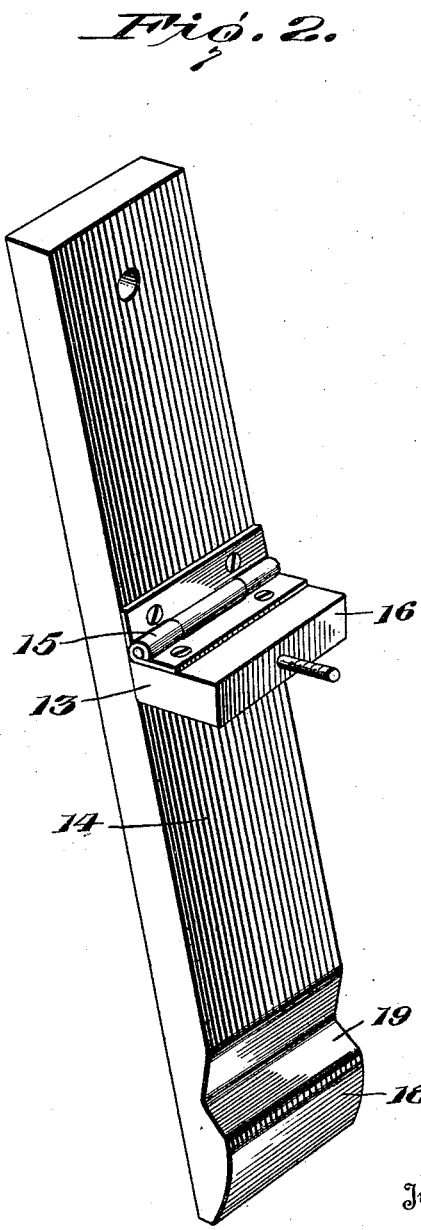

UNITED STATES PATENT OFFICE.

HENRY L. WESTERHAUS, OF PEMBERVILLE, OHIO.

IMPLEMENT FOR PICKING UP EARS OF CORN.

1,412,201.  Specification of Letters Patent.  Patented Apr. 11, 1922.

Application filed April 26, 1921. Serial No. 464,508.

*To all whom it may concern:*

Be it known that I, HENRY L. WESTERHAUS, a citizen of the United States, residing at Pemberville, in the county of Wood and State of Ohio, have invented a certain new and useful Improvement in an Implement for Picking Up Ears of Corn; and I do hereby declare the following to be a full, clear, and exact description of the same, reference being had to the accompanying drawings, forming part of this specification.

This invention relates to an implement for gathering or picking ears of corn up off the ground, the binder frequently knocking the corn ears off the stalks when the latter are being cut.

An object of the invention is to provide a manually operated implement of this character that will not only be inexpensive and durable, but will also be of such simple construction as to not have any appreciable weight, permitting it to be carried for a considerable time without tiring the operator.

In the accompanying drawings,—

Figure 1 is an elevation of the preferred form of implement, the jaws for gripping the corn ear being shown in their closed position; and Fig. 2 is a detail view of the movable gripping jaw detached from the implement.

As shown in the accompanying drawing, in the preferred form of construction, the implement comprises a handle 10 provided at one end with a suitably attached hand hold 11. At its opposite or lower end, handle 10 is formed with a gripping jaw 12. The gripping jaw 12 is integral with the handle and constitutes the fixed gripping jaw of the implement.

Firmly secured to handle 10 above the gripping jaw 12 is a fulcrum block 13 in the form of a lateral projection and pivotally mounted on said fulcrum block is the movable jaw 14 of the implement. Preferably, jaw 14 is pivoted intermediate its ends on said block 13, the connection between the two elements being in the form of an ordinary hinge 15, and the outer face 16 of block 13 is inclined with respect to handle 10 to permit the lower end of jaw 14 to be moved close to jaw 12. The lower end of jaw 14 is held in this closed position by a spring 17 interposed between the upper end of the jaw and the handle 12, the spring serving to thrust said jaw and handle apart at the upper end of the jaw and force the opposite end of jaw 14 towards jaw 12, due to jaw 14 being fulcrumed between its ends. Preferably, spring 17 is loosely carried on a bolt extending through handle 10, the spring being of greater length than the bolt and retained thereon by jaw 14.

At their lower ends, both of jaws 12 and 14 are tapered as at 18 to form a flared entrance that will facilitate the entry of the ear of corn between the jaws.

To insure the ear of corn being firmly grasped and retained between the jaws, one of the jaws, preferably jaw 14, is provided with a transversely extending recess or depression 19. This recess is substantially semi-circular in cross-sectional contour, conforming somewhat to the shape of an ear of corn, and forms a pocket, so to speak, into which the ear of corn will be forced and retained immediately after passing through the entrance of the jaws.

It will be understood that the combined length of handle 10 and jaw 14 is such that a person employing the implement can reach an ear of corn on the ground with it without stooping down. In operation, the jaws 12 and 14 are placed over the ear of corn to be picked up, so that the ear is positioned in the entrance 18 and the implement is then pushed down to force the jaws down over the sides of the ear, the tension of spring 17 being sufficiently light to permit the jaws to be spread apart and allow the ear to pass into pocket 19 without injury to the corn. After the ear has been grasped between the jaws the implement is raised and the ear released by manually manipulating the jaw 14 to spread the jaws apart. This is the only time the jaws are directly manipulated by the operator as the ear of corn forces the jaws open when an ear is being picked up.

What I claim is:

1. In a device of the character described, the combination of a handle, a fixed gripping jaw provided at one end of said handle, a pivotally mounted gripping jaw carried by the handle and movable toward and away from the fixed jaw, means for yieldingly maintaining said jaws in closed position, and a flared entrance between the jaws, one of said jaws having a transversely extending recess formed therein immediately within said entrance.

2. In a device of the character described, the combination of a handle having an integral fixed gripping jaw formed at one end thereof, a laterally projecting fulcrum block carried on the handle, an elongated gripping jaw pivotally mounted intermediate its ends on said fulcrum block, a spring-interposed between the handle and one end of the movable jaw adapted to force that end of the jaw away from the handle, whereby the opposite end of the movable jaw is yieldingly positioned adjacent the fixed gripping jaw formed on the handle.

3. In a device of the character described, the combination of a handle having a fixed gripping jaw formed at one end thereof, a fulcrum block carried by the handle adjacent the gripping jaw, an elongated gripping jaw pivotally mounted intermediate its ends on said fulcrum block, a spring interposed between the handle and pivoted gripping jaw for yieldingly maintaining the gripping jaws in closed position, and a flared entrance between said jaws, one of said jaws having a depression formed therein immediately within said entrance.

HENRY L. WESTERHAUS.